US011872810B2

(12) United States Patent
Kanzaki et al.

(10) Patent No.: US 11,872,810 B2
(45) Date of Patent: Jan. 16, 2024

(54) INK DISCHARGE APPARATUS, INK DISCHARGE METHOD, AND MEDIUM STORING INK DISCHARGE PROGRAM

(71) Applicant: BROTHER KOGYO KABUSHIKI KAISHA, Nagoya (JP)

(72) Inventors: Takashi Kanzaki, Nagoya (JP); Shuhei Suzuki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 87 days.

(21) Appl. No.: 17/527,924

(22) Filed: Nov. 16, 2021

(65) Prior Publication Data

US 2022/0153019 A1 May 19, 2022

(30) Foreign Application Priority Data

Nov. 16, 2020 (JP) ................................ 2020-190083

(51) Int. Cl.
*B41J 2/045* (2006.01)
*B41J 2/21* (2006.01)

(52) U.S. Cl.
CPC ....... *B41J 2/04505* (2013.01); *B41J 2/04551* (2013.01); *B41J 2/04573* (2013.01); *B41J 2/2117* (2013.01)

(58) Field of Classification Search
CPC ............... B41J 2/04505; B41J 2/04526; B41J 2/04551; B41J 2/04556; B41J 2/04596; B41J 2/2114; B41J 2/2132; B41J 2/2135; B41J 25/304; B41J 25/308; B41J 25/3082; B41J 25/3084; B41J 25/3086; B41J 25/3088
See application file for complete search history.

(56) References Cited

U.S. PATENT DOCUMENTS

| | | | | |
|---|---|---|---|---|
| 6,471,315 | B1 | 10/2002 | Kurata | |
| 2002/0051022 | A1 | 5/2002 | Hosono | |
| 2005/0270317 | A1* | 12/2005 | Gao | ..................... B41J 2/16579 347/8 |

FOREIGN PATENT DOCUMENTS

| | | | |
|---|---|---|---|
| JP | H11-240146 | A | 9/1999 |
| JP | 2002-192714 | A | 7/2002 |
| JP | 2012-206355 | A | 10/2012 |
| JP | 2017-159493 | A | 9/2017 |

* cited by examiner

*Primary Examiner* — Julian D Huffman
(74) *Attorney, Agent, or Firm* — KENEALY VAIDYA LLP

(57) ABSTRACT

An ink discharge apparatus includes a discharge head and a controller, the discharge head having a plurality of nozzle rows arranged in a first direction, each of the plurality of nozzle rows including a plurality of nozzles arranged to align in a second direction intersecting the first direction. The controller is configured to receive a print job and carry out a mode determining process to determine whether a print mode is a low gap print mode or a high gap print mode based on the print job, and a number of discharge reducing process to reduce the total number of discharging ink per unit time from the plurality of nozzles as compared with the case of the low gap print mode, if the print mode is determined as the high gap print mode.

9 Claims, 15 Drawing Sheets

FIRST DIRECTION

SECOND DIRECTION
(CONVEYANCE DIRECTION)

KB
1
IMAGE RECORDING APPARATUS
10
CONVEYANCE MOTOR
31
MOTOR DRIVER IC
30
CARRIAGE MOTOR
33
MOTOR DRIVER IC
32
CARRIAGE
16
RECORDING MEDIUM READER
77
HEAD DRIVER IC
74
DISCHARGE HEAD
20
RAM
72
ROM
73
CONTROLLER
71
MODE DETERMINING PROCESSOR
71a
NUMBER OF DISCHARGE REDUCING PROCESSOR
71b
NETWORK I/F
70
COMPUTER
200

LOW GAP
PRINT MODE

HIGH GAP
PRINT MODE

INK DISCHARGE APPARATUS, INK DISCHARGE METHOD, AND MEDIUM STORING INK DISCHARGE PROGRAM

CROSS REFERENCE TO RELATED APPLICATIONS

The present application claims priority from Japanese Patent Application No. 2020-190083, filed on Nov. 16, 2020, the disclosure of which is incorporated herein by reference in its entirety.

BACKGROUND

The present teaching relates to an ink discharge apparatus, an ink discharge method, and a medium having stored an ink discharge program which are used in image recording apparatuses such as ink jet printers and the like.

DESCRIPTION OF THE RELATED ART

For example, there are known ink discharge apparatuses which determine the timing for discharging an ink from nozzles according to a distance (referred to as a paper gap) from the nozzles to a recording medium. In this ink discharge apparatus, the timing is determined for discharging the ink from the nozzles on the basis of a longer distance than that detected by a detector. By virtue of this, as compared with the case where the ink is discharged from the nozzles on the timing according to the distance detected by the detector, there is reduced a deviation due to an air resistance between the actual landing position and the target landing position of the ink.

SUMMARY

However, as the gap between the nozzles and the recording medium increases, such a problem arises that the discharged ink does not land on desired positions of the recording medium. It is considered that because a liquid droplet of the ink discharged from a nozzle is very small in volume, even a little air flow can still affect the landing. Especially, as the above gap increases, the discharge flow becomes large (the air flow moving downward due to the discharge of liquid droplets). Then, the large discharge flow and an air flow due to the conveyance of the recording medium form a combined flow to give rise to a printing disarray like a ripple on the recording medium after the printing. As a result, decrease in printing quality is brought about.

Accordingly, an object of the present teaching is to provide an ink discharge apparatus, an ink discharge method, and a medium having stored an ink discharge program which are configured to facilitate ready landing of the discharged ink on desired positions of the recording medium.

According to an aspect of the present teaching, there is provided an ink discharge apparatus including:

- a discharge head having a plurality of nozzle rows arranged in a first direction, each of the nozzle rows including a plurality of nozzles aligned in a second direction intersecting with the first direction; and
- a controller, wherein the controller is configured to execute:

- a mode determining process to receive a print job and to determine whether a print mode is a low gap print mode or a high gap print mode based on the print job, the low gap print mode being a print mode where a distance between the nozzles and a discharge target medium is low gap, the high gap print mode being a print mode where the distance between the nozzles and the discharge target medium is high gap larger than the low gap; and
- a number of discharge reducing process to reduce a total number of discharging ink per unit time from the nozzles as compared with the case of the low gap print mode, if the print mode is determined as the high gap print mode.

According to the present teaching, if the print mode is the high gap print mode, then the total number of discharging ink per unit time from the plurality of nozzles is reduced as compared with the case of the low gap print mode. By virtue of this, it is possible to reduce a discharge flow comparatively large in the high gap print mode (a downward air flow brought about by discharging liquid droplets). By virtue of this, it is possible to suppress deviation of ink landing due to a combined flow formed of the above discharge flow and another air flow brought about by conveying the recording medium. By virtue of this, it is possible to suppress decrease in the printing quality as compared with a conventional method.

DETAILED DESCRIPTION

Hereinbelow, referring to the accompanied drawings, an explanation will be made on an ink discharge apparatus, an ink discharge method, and an ink discharge program according to embodiments of the present teaching. The ink discharge apparatus, the ink discharge method, and the ink discharge program explained below are merely a few embodiments of the present teaching. Therefore, the present teaching is not limited to the following embodiments but can undergo additions, deletions, and modifications without departing from the true spirit and scope of the present teaching.

First Embodiment

Figure 1:
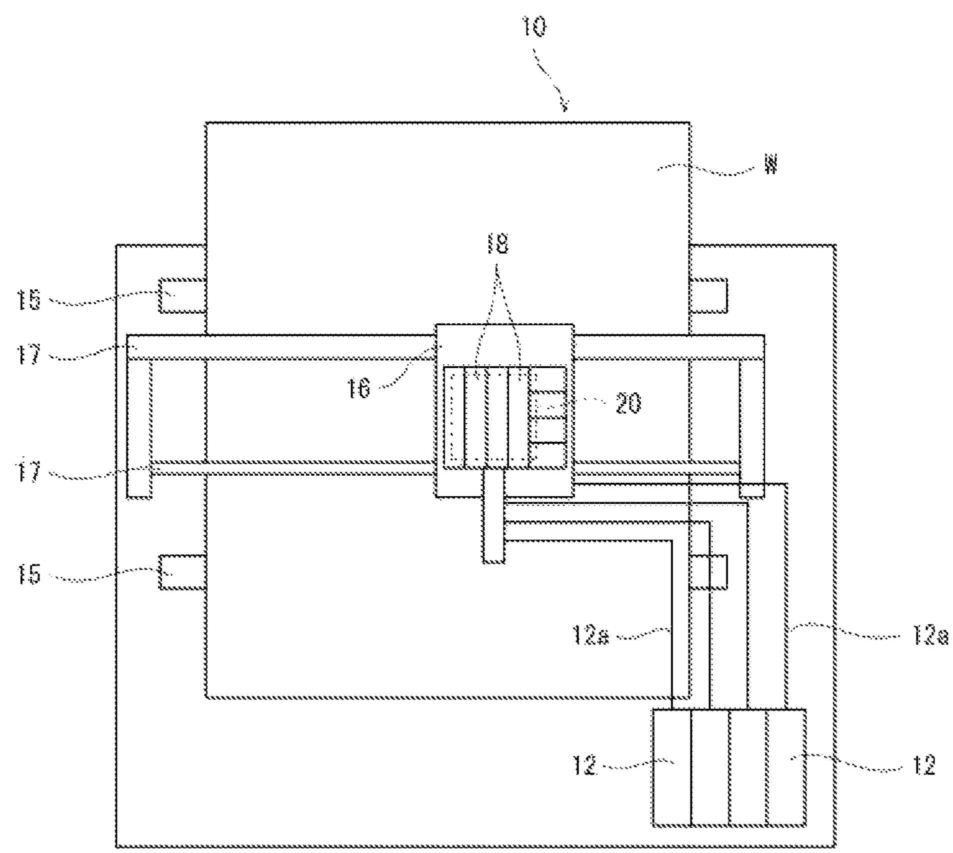
FIG. 1 is a plan view of a schematic configuration of an ink discharge apparatus.

An ink discharge apparatus 10 according to a first embodiment is configured to discharge an ink. As depicted in FIG. 1, the ink discharge apparatus 10 includes storage tanks 12 corresponding to the tank, a carriage 16, a discharge head 20, a pair of conveyance rollers 15, a pair of guide rails 17, and sub tanks 18. Note that in the ink discharge apparatus 10, a discharge target medium W is placed on an undepicted platen.

The discharge head 20 including sub tanks 18 is mounted on the carriage 16. The carriage 16 is supported on the pair of guide rails 17 extending in a first direction orthogonal to a conveyance direction (a second direction) for the recording medium W, to reciprocate in the first direction along the guide rails 17. By virtue of this, the discharge head 20 also reciprocates in the first direction. The discharge head 20 configured in this manner is connected to the storage tanks 12 via a tube 12*a*.

The pair of conveyance rollers 15 are arranged parallel to each other along the first direction. The conveyance rollers 15 are driven by an undepicted conveyance motor to rotate, thereby conveying the recording medium W on the platen in the conveyance direction.

Inks are stored in the storage tanks 12. The storage tanks 12 are connected to the discharge head 20 via ink flow channels to supply the inks to the discharge head 20. Further, the storage tanks 12 are provided according to each type of the inks. The storage tanks 12 are provided, for example, in the number of four to store respectively the inks of black, yellow, cyan, and magenta.

Figure 2:
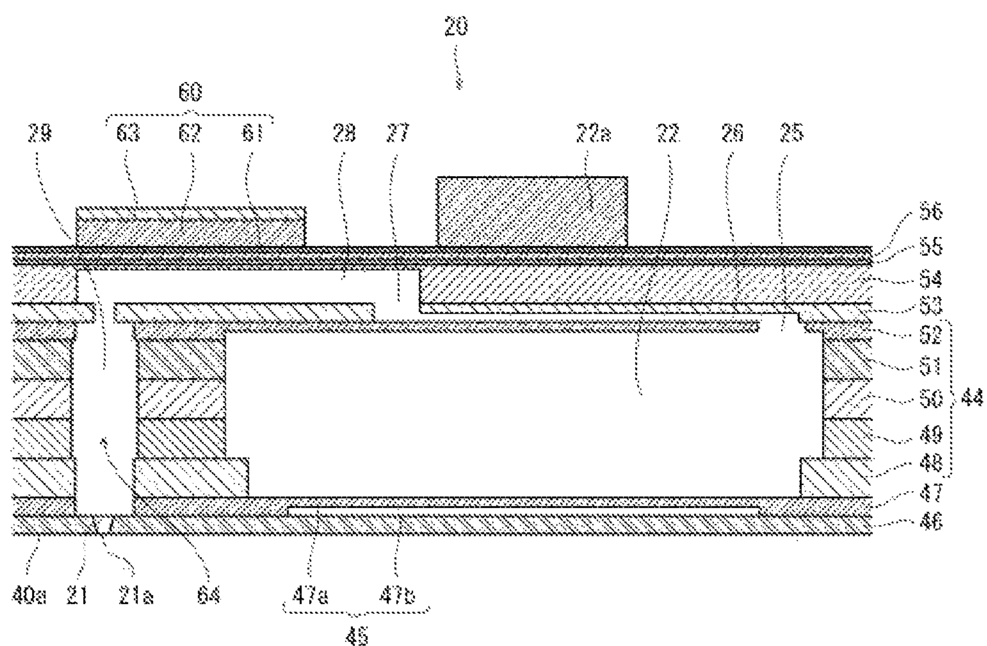
FIG. 2 is a cross section view depicting a configuration of a discharge head.
Figure 2:
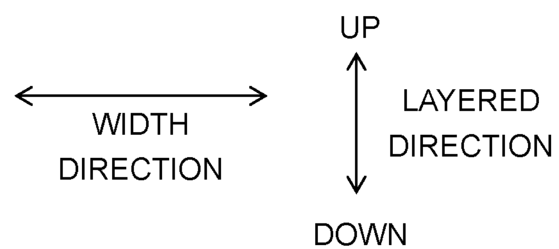

As depicted in FIG. 2, the discharge head 20 has a plurality of nozzles 21 to discharge liquid droplets, using the inks from the storage tanks 12. The discharge head 20 has a layered body formed from a flow channel formation body and a volume changing unit. The flow channel formation body is formed therein with the ink flow channels, and with a plurality of nozzle holes 21*a* opening in a discharge surface 40*a* which is the lower surface thereof. Further, the volume changing unit is driven to change the volume of the ink flow channels. On this occasion, meniscus vibrates in the nozzle holes 21*a* to discharge the inks. Hereinbelow, the configuration of the discharge head 20 will be explained.

As depicted in FIG. 2, the flow channel formation body of the discharge head 20 is a layered body in which a plurality of plates are layered or stacked. The volume changing unit includes a vibration plate 55 and an actuator 60 (piezoelectric elements). An isolation film 56 is connected to the upside of the vibration plate 55, while an aftermentioned common electrode 61 is connected to the upside of the isolation film 56.

The plates are stacked to include, in the order from the downside, a nozzle plate 46, a spacer plate 47, a first flow channel plate 48, a second flow channel plate 49, a third flow channel plate 50, a fourth flow channel plate 51, a fifth flow channel plate 52, a sixth flow channel plate 53, and a seventh flow channel plate 54. A plate 44 for a manifold is formed from the first flow channel plate 48, the second flow channel plate 49, the third flow channel plate 50, the fourth flow channel plate 51, and the fifth flow channel plate 52.

Each plate is formed therein with holes and ditches in various sizes. The respective plates are stacked to form the flow channel formation body in which the holes and ditches are combined to form the plurality of nozzles 21, a plurality of individual flow channels 64, and the manifold 22 as the ink flow channels.

The nozzles 21 are formed to penetrate through the nozzle plate 46 in the layered direction. In the discharge surface 40*a* of the nozzle plate 46, the plurality of nozzles 21 which are the leading ends of the nozzles 21 form a plurality of nozzle rows aligning in an arrayal direction. The arrayal direction is orthogonal to the layered direction.

The manifold 22 supplies the inks to aftermentioned pressure chambers 28 to which an ink discharge pressure is applied. The manifold 22 extends in the arrayal direction to connect respectively to each one end of the plurality of individual flow channels 64. That is, the manifold 22 functions as an ink common flow channel. The manifold 22 is formed to overlap in the layered direction with through holes penetrating through the first flow channel plate 48 to the fourth flow channel plate 51 in the layered direction and recesses recessing from the lower surface of the fifth flow channel plate 52.

The nozzle plate 46 is arranged below the spacer plate 47. The spacer plate 47 is formed of a stainless steel for example. The spacer plate 47 is formed with a recess 45 recessing in the thickness direction of the spacer plate 47 from the surface at the side of the nozzle plate 46, by way of half etching, for example. The recess 45 has a thin part forming a damper part 47*a*, and a damper space 47*b*. By virtue of such configuration, between the manifold 22 and the nozzle plate 46, the damper space 47*b* is formed as a buffer space.

The manifold 22 is in communication with a supply port 22*a*. The supply port 22*a* is formed into a cylindrical shape, for example, and provided at one end in the arrayal direction (the longitudinal direction of the manifold 22). Note that the manifold 22 and the supply port 22*a* are in communication through an undepicted flow channel provided to penetrate respectively through an upper part of the fifth flow channel plate 52, the sixth flow channel plate 53, and the seventh flow channel plate 54.

The plurality of individual flow channels 64 are connected respectively with the manifold 22. Upstream ends of the individual flow channels 64 are connected to the manifold 22 and downstream ends of the individual channels 64 are connected respectively with the base ends of the nozzles 21. The individual flow channels 64 are each constructed from a first communication hole 25, a supply throttle channel 26 being an individual throttle channel, a second communication hole 27, a pressure chamber 28, and a descender 29. Those components are arranged in the same order as written above.

The first communication hole 25 is connected to the upper end of the manifold 22 with its lower end. The first communication hole 25 extends upward in the layered direction from the manifold 22 and to penetrate through an upper part of the fifth flow channel plate 52 in the layered direction.

An upstream end of the supply throttle channel 26 is connected to the upper end of the first communication hole 25. The supply throttle channel 26 is formed by way of half etching, for example, and is constructed from a ditch recessing from the lower surface of the sixth flow channel plate 53. Further, an upstream end of the second communication hole 27 is connected to a down stream end of the supply throttle channel 26. The second communication hole 27 extends upward in the layered direction from the supply throttle channel 26 and to penetrate through the sixth flow channel plate 53 in the layered direction.

An upstream end of the pressure chamber 28 is connected to a downstream end of the second communication hole 27. The pressure chamber 28 is formed to penetrate through the seventh flow channel plate 54 in the layered direction.

The descender 29 is formed to penetrate in the layered direction through the spacer plate 47, the first flow channel plate 48, the second flow channel plate 49, the third flow channel plate 50, the fourth flow channel plate 51, the fifth flow channel plate 52, and the sixth flow channel plate 53. An upstream end of the descender 29 is connected to a downstream end of the pressure chamber 28 and a downstream end of the descender 29 is connected to the base end of the nozzle 21. The nozzle 21 is arranged, for example, at the center of the descender 29 in the width direction to overlap in the layered direction with the descender 29.

The vibration plate 55 is stacked on the seventh flow channel plate 54 to cover the upper opening of the pressure chamber 28.

The actuator 60 includes the common electrode 61, a piezoelectric layer 62, and an individual electrode 63, and those members are arranged in the same order as written above. The common electrode 61 covers the entire surface of the vibration plate 55 via the isolation film 56. The piezoelectric layer 62 is provided according to each pressure chamber 28 and arranged on the common electrode 61 to overlap the pressure chamber 28. The individual electrode 63 is also provided according to each pressure chamber 28 and arranged on the piezoelectric layer 62. One actuator 60 is constructed from one individual electrode 63 and such a part of the piezoelectric layer 62 as interposed between the common electrode 61 and the two electrodes.

The individual electrode 63 is connected electrically to a driver IC. The driver IC receives a control signal from an undepicted controller to generate a drive signal (voltage signal) to be applied to the individual electrode 63. On the other hand, the common electrode 61 is kept at the ground potential constantly. In such a configuration, according to the drive signal, an active part of the piezoelectric layer 62 extends and contracts in the planar direction together with the two electrodes 62 and 63. In response to that, the vibration plate 55 deforms such that the pressure chamber 28 changes its volume in the directions of increase and decrease. By virtue of this, the pressure chamber 28 is applied to by a discharge pressure to discharge the ink from the nozzle 21.

In the discharge head 20 of such kind as described above, the supply port 22*a* is connected to a sub tank 18 via a pipe. If a pressure applying pump provided for the pipe is driven, then the ink passes through the pipe from the sub tank 18 and flows into the manifold 22 via the supply port 22*a*. Then, the ink flows on into the supply throttle channel 26 from the manifold 22 via the first communication hole 25 and then flows into the pressure chamber 28 from the supply throttle channel 26 via the second communication hole 27. Further, the ink flows through the descender 29 and finally into the nozzle 21. On this occasion, if the actuator 60 applies the discharge pressure to the pressure chamber 28, then the ink is discharged from the nozzle hole 21*a*.

Next, an explanation will be made on an image recording apparatus 1 such as an ink jet printer or the like, for example, which includes the ink discharge apparatus 10 of the first embodiment.

Figure 3:
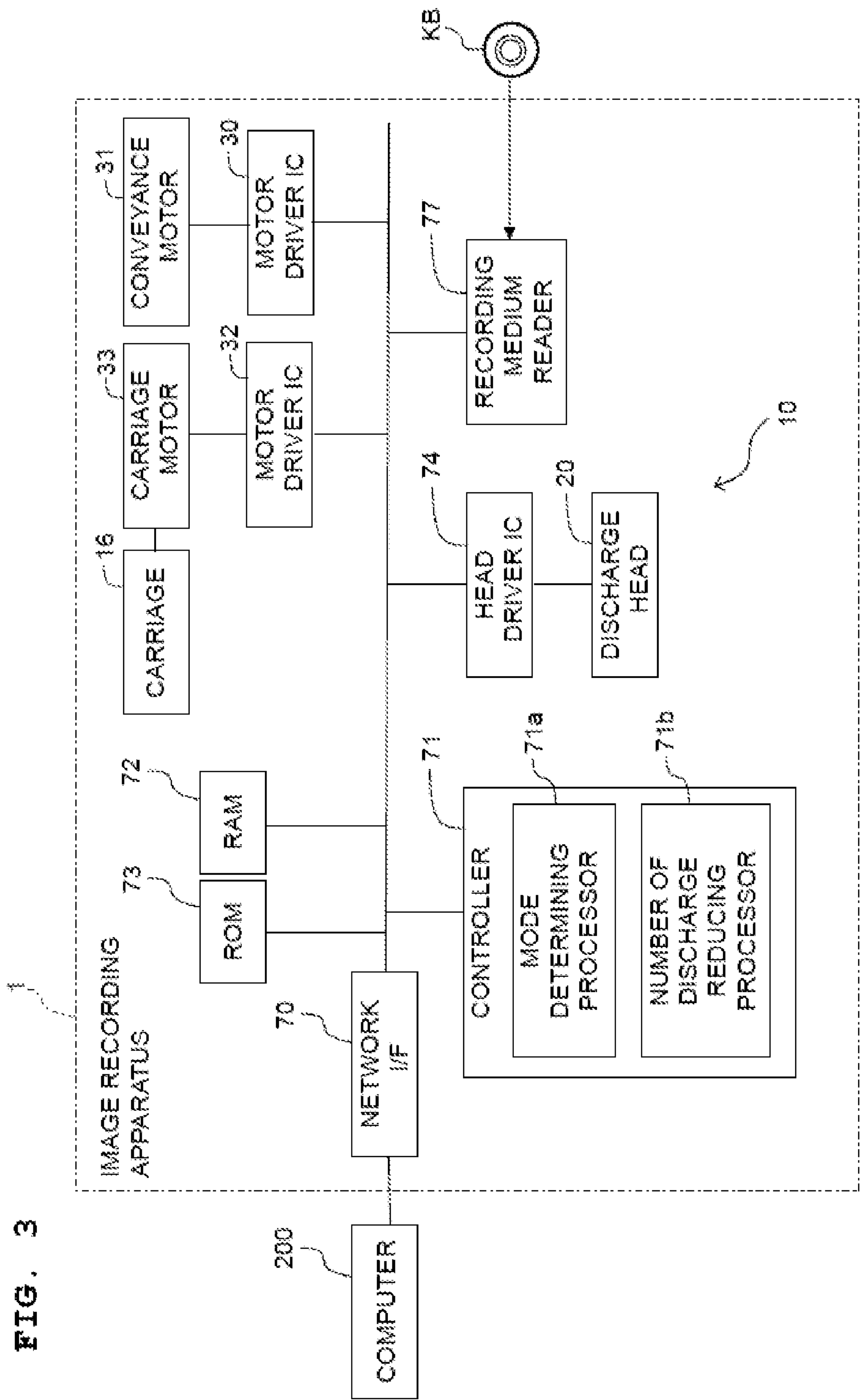
FIG. 3 is a block diagram depicting a configuration of an image recording apparatus.

As depicted in FIG. 3, the image recording apparatus 1 includes other members than the ink discharge apparatus 10, which are a network interface (I/F) 70, a controller 71 constructed from a CPU and the like, a RAM 72, a ROM 73, a head driver IC 74, a recording medium reader 77, motor drivers 30 and 32, a conveyance motor 31, and a carriage motor 33. Note that the controller 71 corresponds to the computer.

The controller 71 has a mode determining processer 71*a* and a number of discharge reducing processer 71*b* as its functional configuration. The controller 71 executes a predetermined computer program to functionally realize the mode determining processer 71*a* and the number of discharge reducing processer 71*b*.

The mode determining processer 71*a* of the controller 71 receives print jobs sent from a computer 200 or the like which is an external device. Further, based on a received print job, the mode determining processer 71*a* carries out a mode determining process to determine whether a print mode is a low gap print mode where the distance between the nozzle 21 and the recording medium W is a low gap, or a high gap print mode where the distance is a high gap being longer than that of the low gap. Note that the low gap and the high gap will be described later on.

Further, if the mode determining processer 71*a* determines that the print mode is the high gap print mode, then the number of discharge reducing processer 71*b* generates a discharge data to be used in a number of discharge reducing process and carries out the number of discharge reducing process based on that discharge data. The number of discharge reducing process reduces the total number of discharging ink per unit time from the plurality of nozzles 21 as compared with the low gap print mode.

The RAM 72 temporarily stores the print job received from the computer 200 such as an external personal computer or the like via the network interface 70. Further, the RAM 72 also temporarily stores the discharge data and the like.

The ROM 73 stores a control program for executing an ink discharge program and carrying out various kinds of data processing in the first embodiment.

The head driver IC 74 receives an instruction from the controller 71 to cause the discharge head 20 to discharge liquid droplets. In the same manner, a motor driver IC 30 receives an instruction from the controller 71 to control the driving of the conveyance motor 31. The conveyance motor 31 conveys the recording medium W by actuating the conveyance rollers 15. After the recording medium W faces the discharge head 20 with the part to which no liquid droplets are discharged, a motor driver IC 32 receives an instruction from the controller 71 to control the driving of the carriage motor 33. The carriage motor 33 actuates the carriage 16 to move the discharge head 20 in the first direction. Within the movable range of the carriage 16 in the first direction, the printing range refers to that where the discharge head 20 faces the recording medium W. The head driver IC 74 may receive the instruction from the controller 71 to cause the discharge head 20 either to discharge liquid droplets over the whole printing range or to discharge the liquid droplets only in part of the printing range. The whole printing range or the part of the printing range corresponds to one path. Further, when the motor driver IC 32 receivers the instruction from the controller 71 to move the carriage 16 in the first direction a number of times, the head driver IC 74 may receive the instruction from the controller 71 to cause the discharge head 20 to discharge the liquid droplets in each moving. That is, the paths are overlapped. Note that when the motor driver IC 32 receives the instruction from the controller 71 to move the carriage 16 a number of times in the printing range in the first direction, the moving while causing the discharge head 20 to discharge the liquid droplets and the moving while not causing the discharge head 20 to discharge the liquid droplets may be repeated alternately.

The recording medium reader 77 is a device of reading out the ink discharge program from a computer readable recording medium KB such as a flexible disk, a CD (CD-ROM, CD-R, CD-RW, or the like), a DVD (DVD-ROM, DVD-RAM, DVD-R, DVD+R, DVD-RW, DVD+RW, or the like), a Blu-ray disk, an optical disk, a photomagnetic disk, or the like. The recording medium reader 77 may also be a device of reading out the ink discharge program from a recording medium such as a USB flash memory or the like. The ROM 73 stores the readout ink discharge program for the controller 71 to execute. Note that in the first embodiment, the ROM 73 may store the ink discharge program either sent from the external computer 200 via the network interface 70 or downloaded from the Internet.

Next, referring to FIGS. 4A to 4C, an explanation will be made on the distance between the discharge surface 40*a* (the lower end of the nozzle hole 21*a*) and the recording medium W.

Figure 4A:
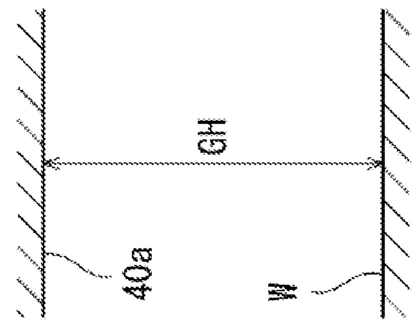
FIG. 4A is a diagram for explaining a high gap.
Figure 4B:
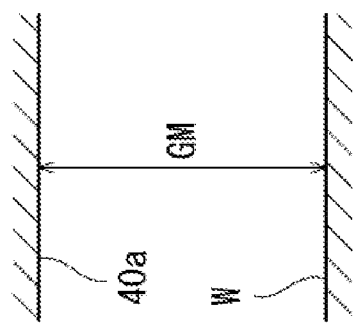
FIG. 4B is a diagram for explaining a middle gap.
Figure 4B:
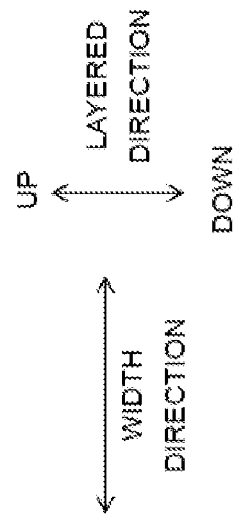
Figure 4C:
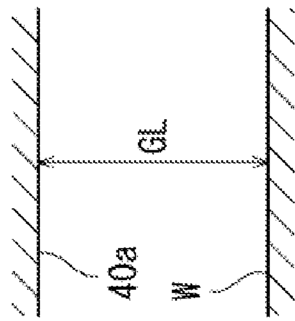
FIG. 4C is a diagram for explaining a low gap.

As depicted in FIG. 4A, let the maximal distance between the discharge surface 40*a* and the recording medium W be referred to as high gap GH. Further, as depicted in FIG. 4C, let the distance between the discharge surface 40*a* and the recording medium W be referred to as low gap GL which is smaller than the high gap GH. Further, as depicted in FIG. 4B, let one or more than one distance between the discharge surface 40*a* and the recording medium W be collectively referred to as a middle gap GM which is larger than the low gap GL but smaller than the high gap GH. In this manner, a print job of the first embodiment includes information indicating the low gap print mode for carrying out printing at the low gap, the high gap print mode for carrying out printing at the high gap, and the middle gap print mode for carrying out printing at the middle gap. The information indicating the low gap print mode, the high gap print mode, and the middle gap print mode is obtained under a user's instruction.

Figure 5:
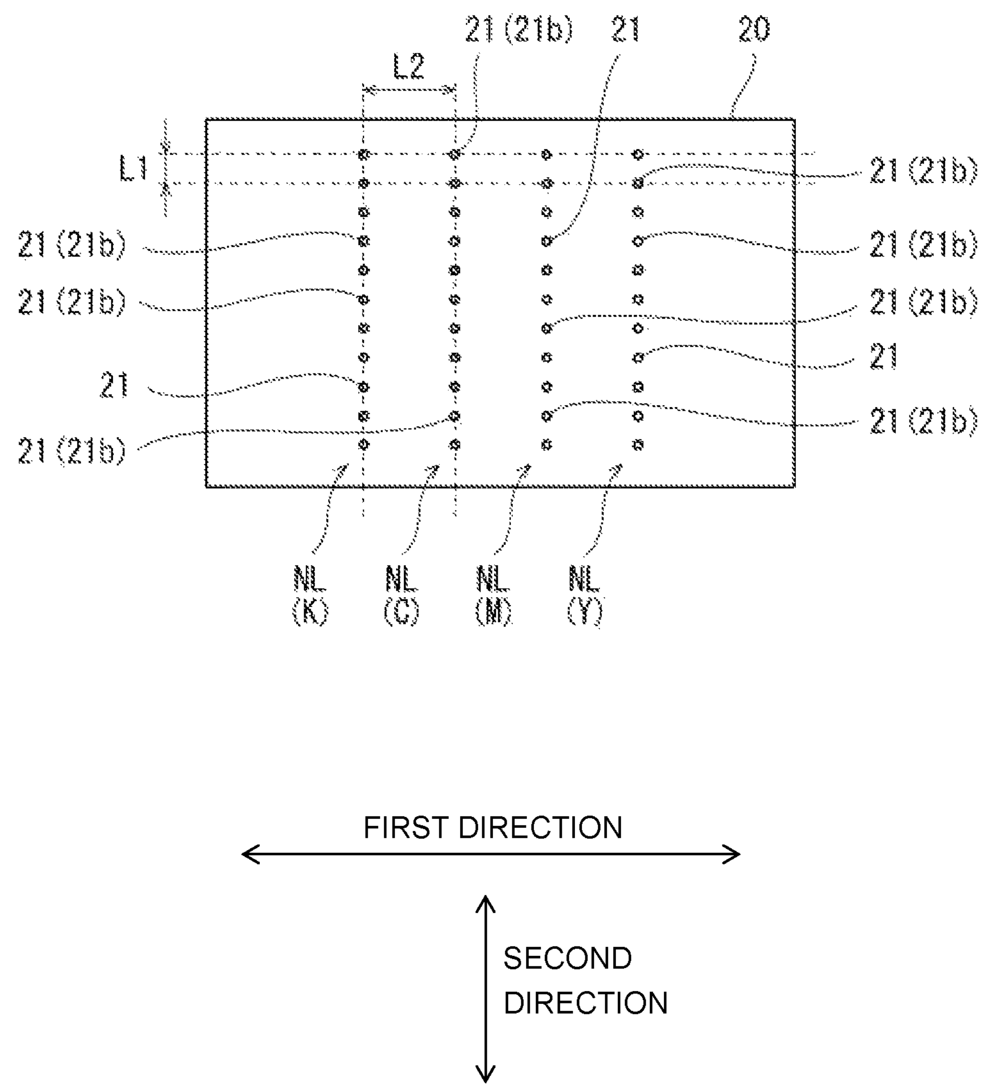
FIG. 5 depicts an example of nozzle arrangement in the discharge head.

In this context, an explanation will be made on arranging the nozzles 21 in the discharge head 20. As depicted in FIG. 5, the discharge head 20 is provided with a plurality of nozzle rows NL (four rows in FIG. 5). Those nozzle rows NL are arranged in the first direction almost at equal intervals. Each nozzle row NL includes a plurality of nozzles 21 aligned in the second direction. Note that in the order from one side in the first direction (from the left end in FIG. 5), for example, there are arranged the nozzle row NL formed from the plurality of nozzles 21 to discharge the black ink, the nozzle row NL formed from the plurality of nozzles 21 to discharge the cyan ink, the nozzle row NL formed from the plurality of nozzles 21 to discharge the magenta ink, and the nozzle row NL formed from the plurality of nozzles 21 to discharge the yellow ink.

Figure 6A:
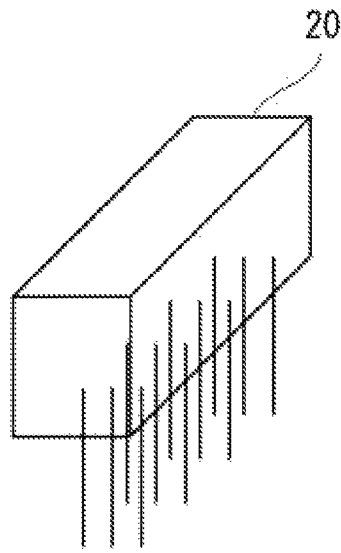
FIG. 6A is a perspective view depicting an image of ink discharge in a low gap print mode and FIG. 6B is a perspective view depicting an image of ink discharge in a high gap print mode.
Figure 6B:
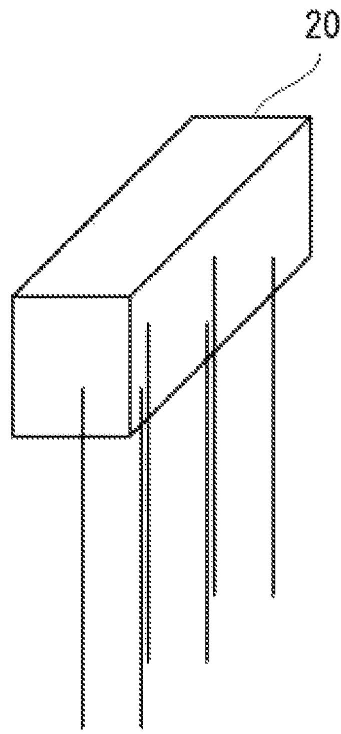
Figure 6B:
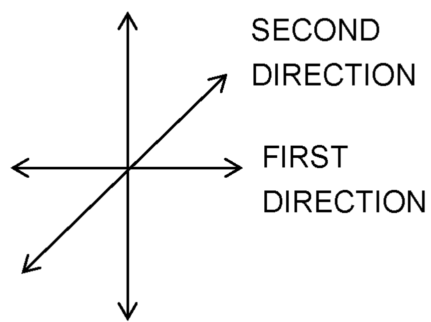

As described above, in the case of the high gap print mode, in the number of discharge reducing process, the total number of discharging ink per unit time from the plurality of nozzles 21 is reduced as compared with the case of the low gap print mode. FIG. 6B depicts an image of the number of discharge reducing process. As depicted in FIG. 6B, in the high gap print mode, the ink is not discharged from one or more than one nozzle 21 included in each of the nozzle rows NL, by not applying the drive signal to one or more than one individual electrode 63 corresponding to the one or more than one nozzle 21. In this manner, in the case of the high gap print mode, differently from the low gap print mode depicted in FIG. 6A, some of the nozzles 21 are left aside or suspended as the nozzles not discharging the ink (the ink non-discharge nozzles) in each nozzle row NL (namely in the first direction). That is, some of the nozzles 21 are suspended in the second direction as target nozzles 21*b* (FIG. 5) which are reduction targets in the number of discharge reducing process.

It is possible to set a condition as follows for carrying out the number of discharge reducing process. In the discharge head 20 of FIG. 5, an interval between adjacent nozzles 21 in the second direction is L1 in each of the nozzle rows NL. Further, an interval between adjacent nozzle rows NL in the first direction is L2. In such a configuration, if L1 is smaller than L2, then the number of discharge reducing processer 71*b* carries out the number of discharge reducing process such that the ink is not discharged from the aforementioned target nozzles 21*b*.

Figure 7:
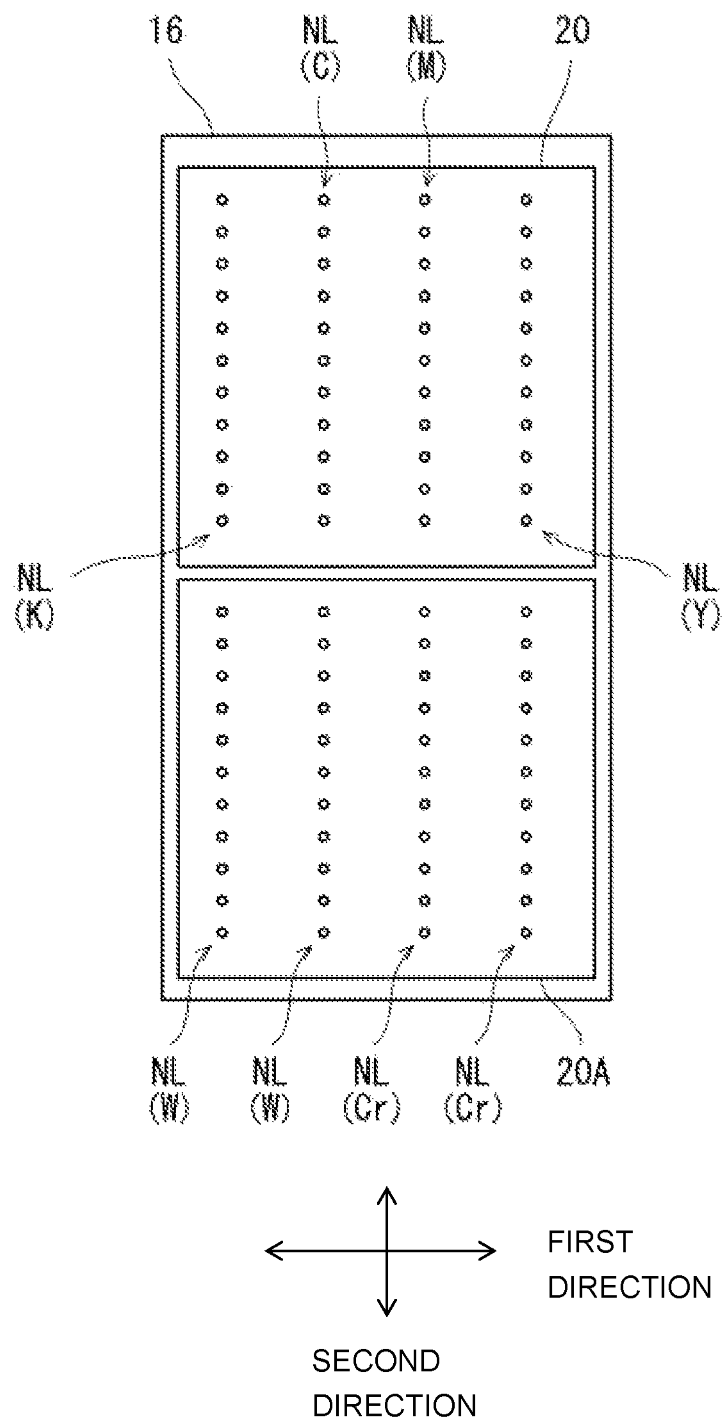
FIG. 7 depicts a modified embodiment of the discharge head.

As another aspect of the discharge head, as depicted in FIG. 7, two discharge heads may be provided on the carriage 16. In this case, in the same manner as described earlier on, the discharge head 20 and the discharge head 20A are arranged to align in the second direction. The discharge head 20A is provided with a plurality of nozzle rows NL (four rows in FIG. 7). The plurality of nozzle rows NL are arranged in the first direction almost at equal intervals. Each nozzle row NL includes a plurality of nozzles 21 arranged to align in the second direction. Note that in the order from one side in the first direction (from the left end in FIG. 7), for example, there are arranged the nozzle row NL formed from the plurality of nozzles 21 to discharge a white ink, the nozzle row NL formed from the plurality of nozzles 21 to discharge the same white ink, the nozzle row NL formed from the plurality of nozzles 21 to discharge a clear ink, and the nozzle row NL formed from the plurality of nozzles 21 to discharge the same clear ink. Note that the white ink is discharged to form the base color while the clear ink is discharged in the case of rendering gloss or protecting the printed part.

Figure 8:
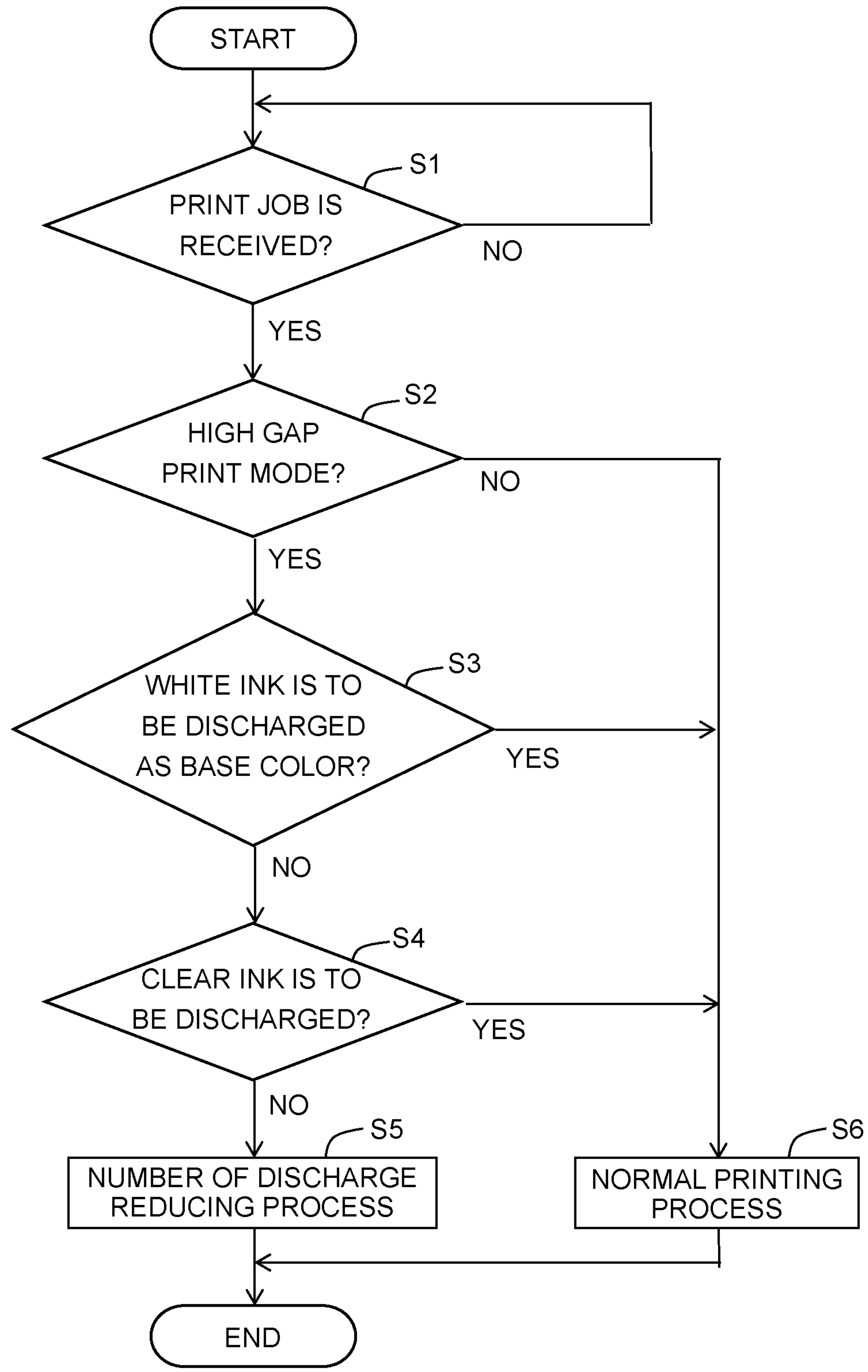
FIG. 8 is a flow chart for explaining a printing process.

As depicted in FIG. 8, first, the mode determining processer 71*a* of the controller 71 determines whether or not any print job is received from the computer 200 which is an external device (step S1). If a print job is received (step S1: Yes), then the mode determining processer 71*a* determines whether or not the print mode is the high gap print mode based on the print job (step S2). On the other hand, if no print job is received (step S1: No), then the mode determining processer 71*a* stands by until a print job is received.

Next, if the print mode is the high gap print mode (step S2: Yes), then the number of discharge reducing processer 71*b* determines whether or not there are discharges of the white ink as the base color based on the print job (step S3). If there is no discharge of the white ink as the base color (step S3: No), then the number of discharge reducing processer 71*b* determines whether or not there are discharges of the clear ink (step S4). If there is no discharge of the clear ink (step S4: No), then the number of discharge reducing processer 71*b* generates the discharge data for use in the number of discharge reducing process and carries out the aforementioned number of discharge reducing process as a printing process (step S5).

On the other hand, if the print mode is not the high gap print mode (step S2: No) and there is discharge of the white ink as the base color (step S3: Yes) and there is discharge of the clear ink (step S4: Yes), then the number of discharge reducing processer 71*b* generates the discharge data where the total number of discharging ink per unit time is equivalent to that for the case of the low gap print mode, and carries out a normal printing process.

In the manner as described above, according to the ink discharge apparatus 10 of the first embodiment, if the print mode is the high gap print mode, then the number of discharge reducing process is carried out to reduce the total number of discharging ink as compared with the case of the low gap print mode, per unit time from the plurality of nozzles 21 in the plurality of nozzle rows NL. By virtue of this, it is possible to reduce a discharge flow comparatively large in the high gap print mode (a downward air flow brought about by discharging liquid droplets). By virtue of this, it is possible to suppress deviation of ink landing due to a combined flow formed of the above discharge flow and another air flow brought about by conveying the recording medium W. By virtue of this, it is possible to suppress decrease in the printing quality as compared with a conventional method.

Further, in the first embodiment, the number of discharge reducing processer 71*b* is configured to prevent the target nozzles 21*b* from discharging the ink in the number of discharge reducing process. By virtue of this, it is possible to realize the number of discharge reducing process easily.

Further, in the first embodiment, in the discharge head 20, if the interval L1 between the adjacent nozzles 21 in the second direction in each nozzle row NL is smaller than the interval L2 between the adjacent nozzle rows NL in the first direction, then the number of discharge reducing processer 71*b* carries out the number of discharge reducing process. By virtue of this, if the interval L1 is not smaller than the interval L2 (that is, the nozzle interval in the second direction is sufficiently large), then it is conceivable that there is almost no influence caused by the discharge flow due to the adjacent nozzles in the second direction, such that it is possible to carry out the normal printing process.

Further, in the first embodiment, if the print mode is not the high gap print mode and, meanwhile, if the clear ink should be discharged and the white ink should also be discharged, then the normal printing process is carried out (namely the printing process where the total number of discharging ink from the nozzles 21 per unit time is set equivalent to that for the case of the low gap print mode). By virtue of this, it is possible to avoid carrying out the number of discharge reducing process in each of the above cases.

Second Embodiment

A second embodiment will be explained below.

Figure 9:
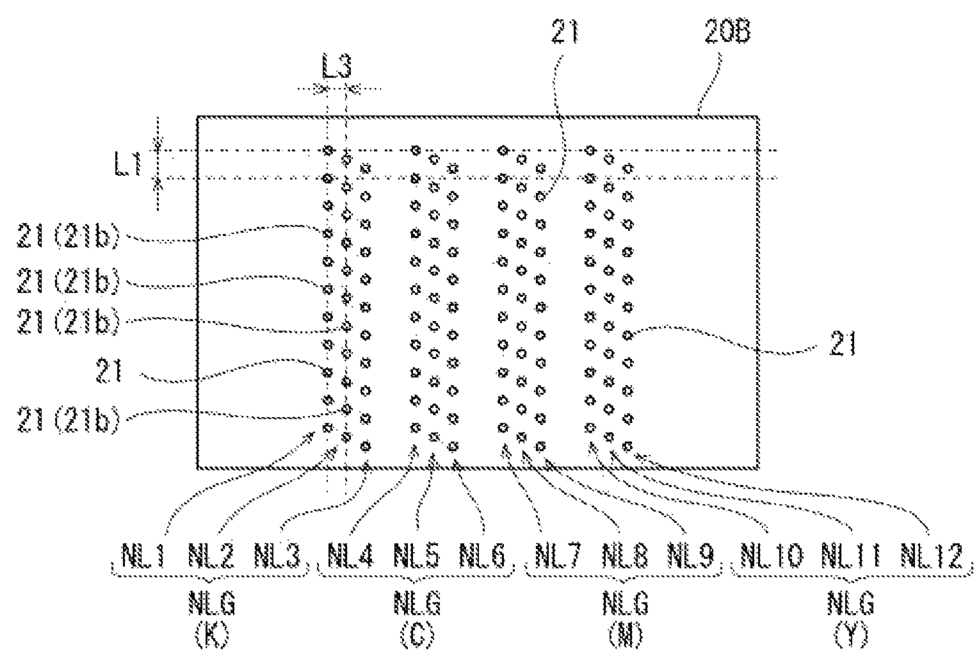
FIG. 9 depicts an example of nozzle arrangement in a discharge head.
Figure 9:
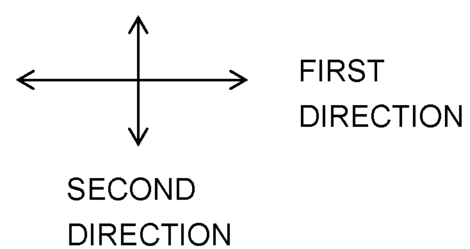

A discharge head 20B depicted in FIG. 9 is provided with a plurality of nozzle row groups NLG (four groups in FIG. 9) in the first direction. Each nozzle row group NLG includes a plurality of nozzle rows NL (three rows in FIG. 9). Note that FIG. 9 depicts each of the nozzle rows NL being identified as NL 1 to NL12. The plurality of nozzle row groups NLG are arranged almost at equal intervals in the first direction. Further, the plurality of nozzle rows NL are arranged almost at equal intervals in the first direction. Each nozzle row NL includes a plurality of nozzles 21 arranged to align in the second direction. Note that in the following order from one side in the first direction (from the left side in FIG. 9), for example, there are arranged the nozzle row group NLG formed from a plurality of nozzles 21 to discharge the black ink, the nozzle row group NLG formed from a plurality of nozzles 21 to discharge the cyan ink, the nozzle row group NLG formed from a plurality of nozzles 21 to discharge the magenta ink, and the nozzle row group NLG formed from a plurality of nozzles 21 to discharge the yellow ink. In each of the nozzle row groups NLG, the interval between the adjacent nozzles 21 in the second direction is L1 in each of the nozzle rows NL, whereas an interval L3 between the adjacent nozzle rows NL in the first direction is L3.

The plurality of nozzles 21 are target nozzles to be targets for reduction in the number of discharge reducing process, including the target nozzles 21*b* provided in predetermined nozzle rows in the plurality of nozzle rows NL of each nozzle row group NLG. In such a configuration, the number of discharge reducing processer 71*b* of the controller 71 carries out the number of discharge reducing process such that the ink is not discharged from the target nozzles 21*b*, if the interval L1 is larger than the interval L3.

For example, if three nozzle rows are included in each nozzle row group NLG, then the following number of discharge reducing process may be carried out. The number of discharge reducing processer 71*b* prevents the target nozzles 21*b* provided in two nozzle rows from discharging the ink among the three nozzle rows NL in each nozzle row group NLG in the number of discharge reducing process, if the interval L1 is larger than two times the value of the interval L3. Note that FIG. 9 depicts only two nozzle rows NL from the left in the nozzle row group NLG (K) as the target nozzles 21*b* in the above two nozzle rows NL, but omits illustration of the target nozzles 21*b* in each of the other three nozzle row groups NLG.

Further, if three nozzle rows are included in each nozzle row group NLG, then the following number of discharge reducing process may be carried out. The number of discharge reducing processer 71*b* executes the number of discharge reducing process such that the ink is not discharged from the target nozzles 21*b* provided in one nozzle row of the three nozzle rows NL in each nozzle row group NLG, if the interval L1 is smaller than two times the value of the interval L3.

Figure 10:
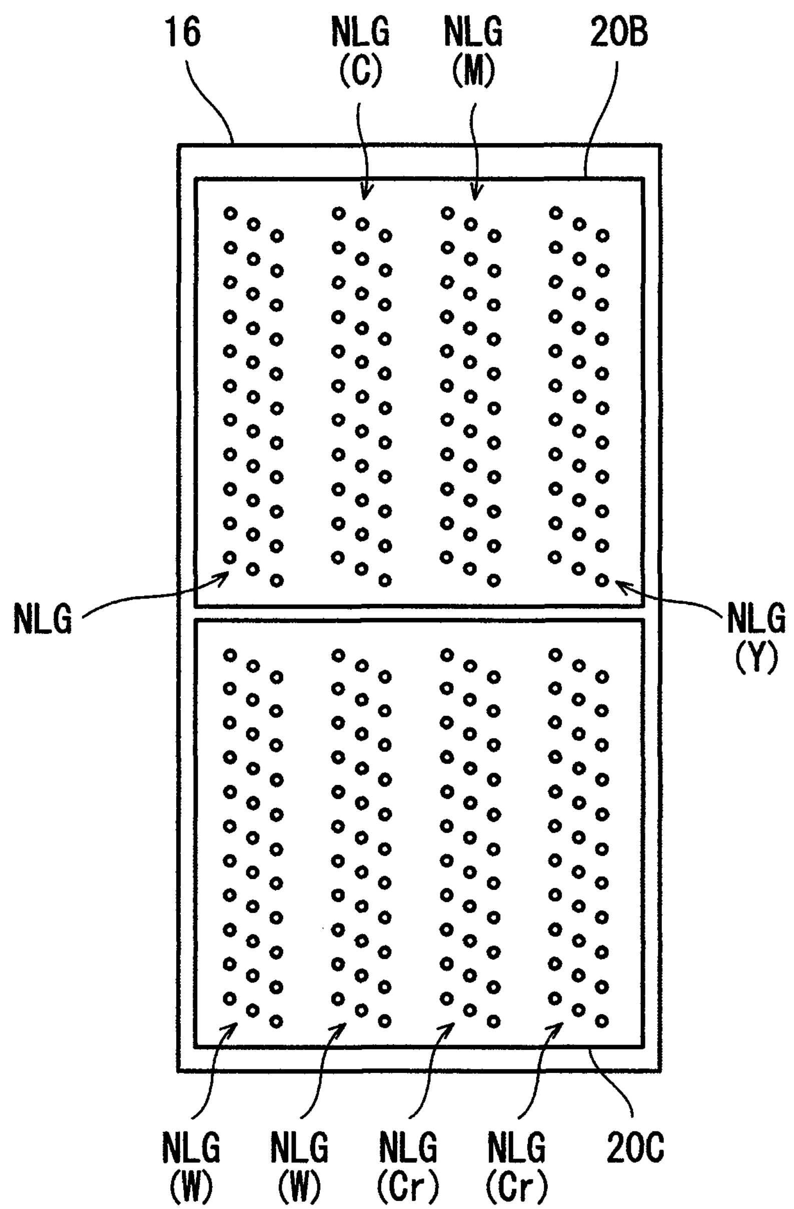
FIG. 10 depicts a modified embodiment of the discharge head.

As depicted in FIG. 10, in the same manner as in the first embodiment, in the second embodiment, the carriage 16 may be provided with two discharge heads. In this case, in the same manner as described earlier on, the discharge head 20B and a discharge head 20C are arranged to align in the second direction. The discharge head 20C is provided with a plurality of nozzle row groups NLG (four nozzle row groups in FIG. 10). The arrangements of the plurality of nozzle rows NL and the plurality of nozzles 21 in the discharge head 21C are the same as in the discharge head 21B. Note that in the following order from one side in the first direction (from the left side in FIG. 10), for example, there are arranged the nozzle row group NLG formed from a plurality of nozzles 21 to discharge the white ink, the nozzle row group NLG formed from a plurality of nozzles 21 to discharge the same white ink, the nozzle row group NLG formed from a plurality of nozzles 21 to discharge the clear ink, and the nozzle row group NLG formed from a plurality of nozzles 21 to discharge same clear ink.

In the ink discharge apparatus 10 according to the second embodiment, the number of discharge reducing processer 71*b* carries out the number of discharge reducing process to prevent the target nozzles 21*b* from discharging the ink, the target nozzles 21*b* being one or more than one nozzle of the plurality of nozzles 21 in predetermined nozzle rows among the plurality of nozzle rows NL in each nozzle row group NLG, if the interval L1 is larger than the interval L3. In this case, considering that the interval L3 is comparatively small, it is possible to carry out the number of discharge reducing process according to each nozzle row NL. By virtue of this, it is possible to suspend some of the ink discharge in the first direction.

Further, in the second embodiment, the number of discharge reducing processer 71*b* carries out the number of discharge reducing process to prevent the target nozzles 21*b* from discharging the ink, the target nozzles 21*b* being one or more than one nozzle of the plurality of nozzles 21 in two nozzle rows among the three nozzle rows NL in each nozzle row group NLG, if the interval L1 is larger than two times the value of the interval L3. In this case, it is possible to carry out the number of discharge reducing process according to every two nozzle rows NL. By virtue of this, it is possible to suspend sufficient ink discharge in the first direction.

Further, in the second embodiment, the number of discharge reducing processer 71*b* carries out the number of discharge reducing process to prevent the target nozzles 21*b* from discharging the ink, the target nozzles 21*b* being one or more than one nozzle of the plurality of nozzles 21 in one nozzle row among the three nozzle rows NL in each nozzle row group NLG, if the interval L1 is smaller than two times the value of the interval L3. In this case, it is possible to carry out the number of discharge reducing process for one nozzle row NL. By virtue of this, it is possible to prevent too much of the suspension of the ink discharge in the first direction.

Third Embodiment

A third embodiment will be explained below.

Figure 11A:
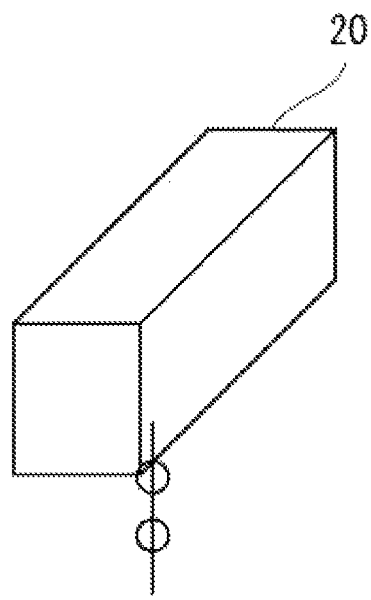
FIG. 11A is a perspective view depicting an image of ink discharge in the low gap print mode and FIG. 11B is a perspective view depicting an image of ink discharge in the high gap print mode.
Figure 11B:
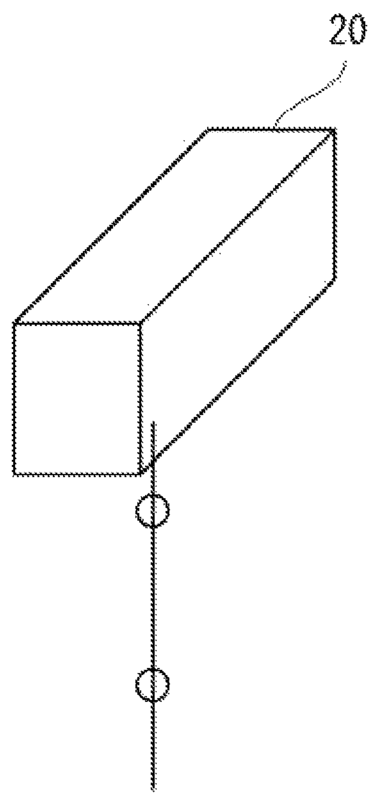
Figure 11B:
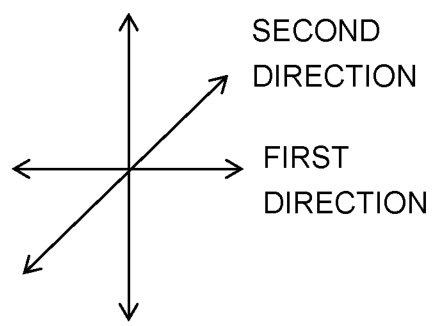

In the third embodiment, if the print mode is the high gap print mode, then a discharge frequency is lowered as compared with that for the low gap print mode. FIG. 11B depicts an image of such number of discharge reducing process. Note that the discharge frequency refers to the number of ink droplets discharged from the nozzles 21 per unit time. As depicted in FIG. 11B, in the high gap print mode, the discharge frequency decreases in one or more than one nozzle of the plurality of nozzles 21 in each nozzle row NL. In this manner, if the print mode is the high gap print mode, then differently from the low gap print mode depicted in FIG. 11A, the discharge frequency of some nozzles 21 is reduced in each nozzle row NL in a discharge frequency reducing process. By virtue of this, it is possible to reduce the discharge flow in the high gap print mode, thereby allowing for suppressing the landing deviation of the ink. In this regard, for example, in the low gap print mode, the discharge frequency is set at 26 kHz whereas in the high gap print mode, the discharge frequency is set at 13 kHz. If the low gap print mode is changed to the high gap print mode, then the drive period, which is the period where one discharge waveform is inputted, extends from about 38 μs to about 77 μs. Between the low gap print mode and the high gap print mode, there is no difference in the discharge waveform where one drive period is inputted; therefore, a time period of about 38 μs is secured from the end of discharge waveform of the previous drive period to the following drive period. By virtue of this, even if the liquid droplets of the previous drive period somehow affect the liquid droplets of the following drive period, because of an extended interval between the current liquid droplets and the previous liquid droplets, the influence from the liquid droplets of the previous drive period is yet less likely to be received without suppression. By virtue of this, it is possible to suppress the ink landing deviation.

Figure 12:
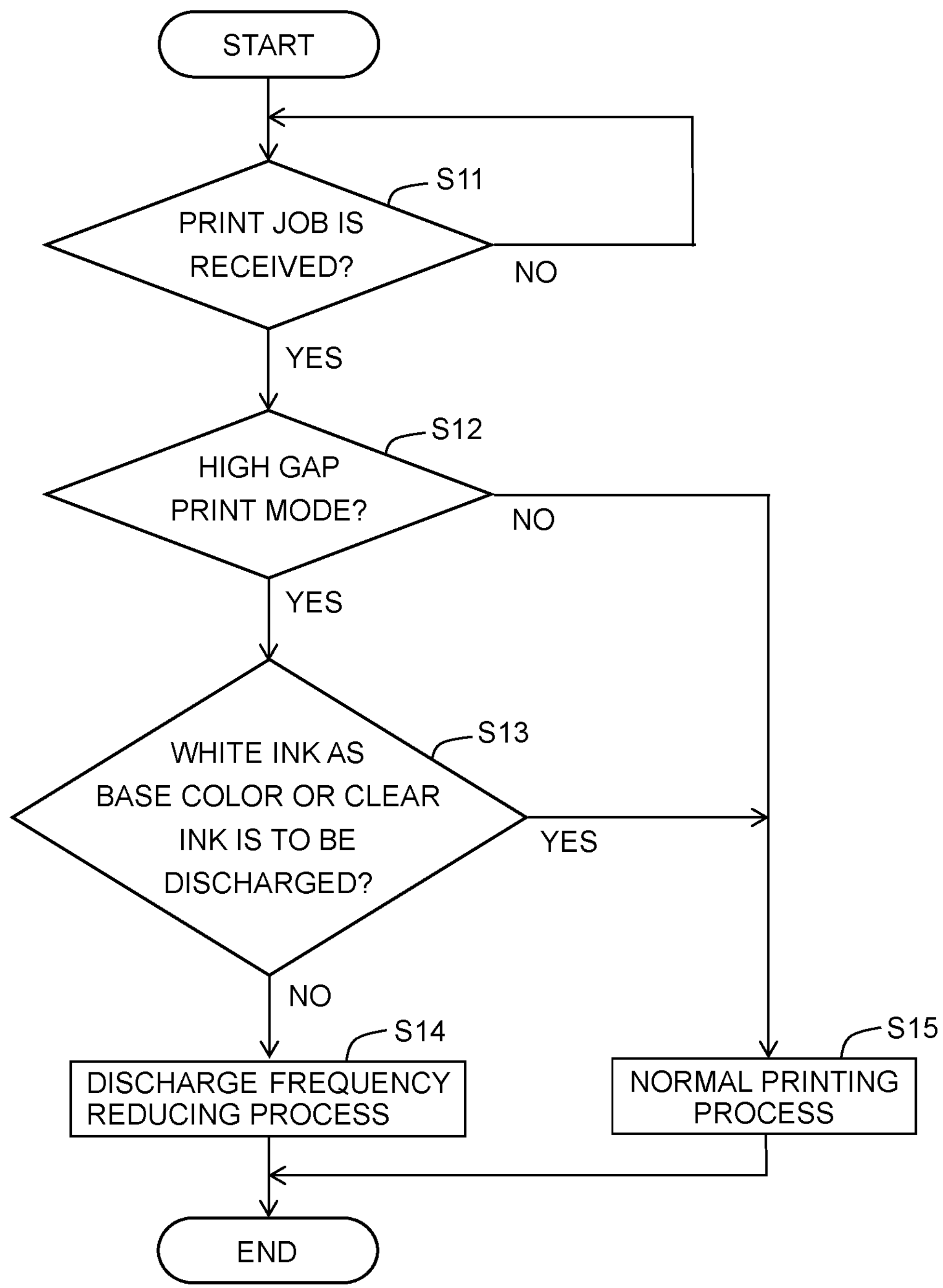
FIG. 12 is a flow chart for explaining a printing process.

As depicted in FIG. 12, first, the mode determining processer 71*a* of the controller 71 determines whether or not any print job is received from the computer 200 which is an external device (step S11). If a print job is received (step S11: Yes), then the mode determining processer 71*a* determines whether or not the print mode is the high gap print mode based on the print job (step S12). On the other hand, if no print job is received (step S11: No), then the mode determining processer 71*a* stands by until a print job is received.

Next, if the print mode is the high gap print mode (step S12: Yes), then the number of discharge reducing processer 71*b* determines whether or not there are discharges of the white ink and discharges of the clear ink based on the print job and, if the white ink should not be discharged and the clear ink should not be discharged (step S13: No), then the number of discharge reducing processer 71*b* generates the discharge data for use in the discharge frequency reducing process and carries out the aforementioned discharge frequency reducing process as the printing process (step S14).

On the other hand, if the print mode is not the high gap print mode (step S12: No) and the white ink should be discharged and the clear ink should be discharged (step S13: Yes), then the controller 71 generates the discharge data without reducing the discharge frequency, and carries out the normal printing process.

In the manner as described above, according to the third embodiment, if the print mode is the high gap print mode, then the discharge frequency is reduced as compared with the case of the low gap print mode. By virtue of this, it is possible to reduce the discharge flow in the high gap print mode. By virtue of this, it is possible to suppress deviation of ink landing. By virtue of this, it is possible to suppress decrease in the printing quality as compared with the conventional method.

Fourth Embodiment

A fourth embodiment will be explained below.

Figure 13:
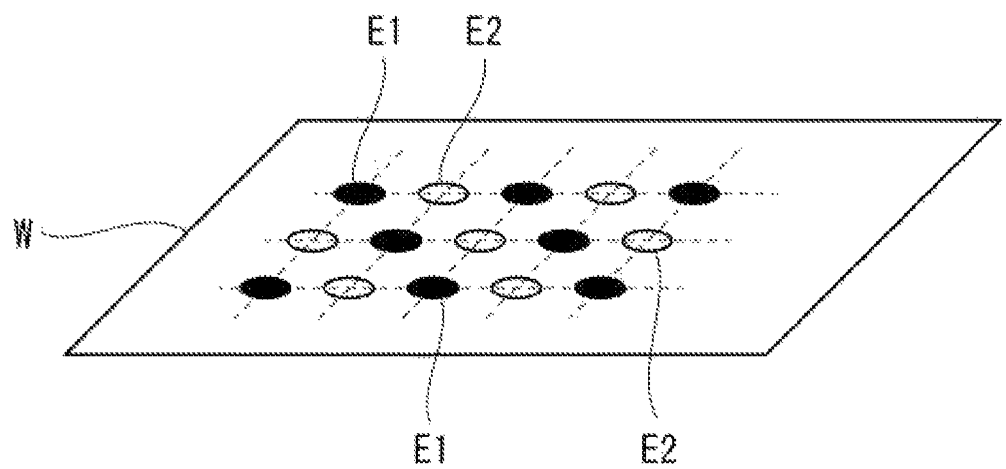
FIG. 13 is a perspective view depicting an image of liquid droplets discharged on a recording medium according to each path in a printing process.
Figure 13:
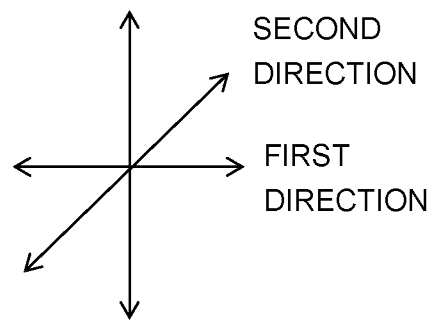

In the fourth embodiment, if the number of discharge reducing processer 71*b* of the controller 71 determines that the print mode is the high gap print mode, then the total number of discharging ink from the plurality of nozzles 21 of the plurality of nozzle rows NL per path is reduced as compared with the case of the low gap print mode, in order to reduce the total number of discharging ink per path by way of discharging over a plurality of overlapped paths. In this case, for example, as depicted in FIG. 13, ink droplets E1 are discharged in the first path and ink droplets E2 are discharged in the second path. In the fourth embodiment, the longer the distance between the nozzles 21 and the recording medium W as in the low gap GL, the middle gap GM and the high gap GH, the more the overlapped paths with the controller 71 controlling the discharge head 20 while reducing the total number of discharging ink per path as compared with the case of the low gap print mode.

Figure 14:
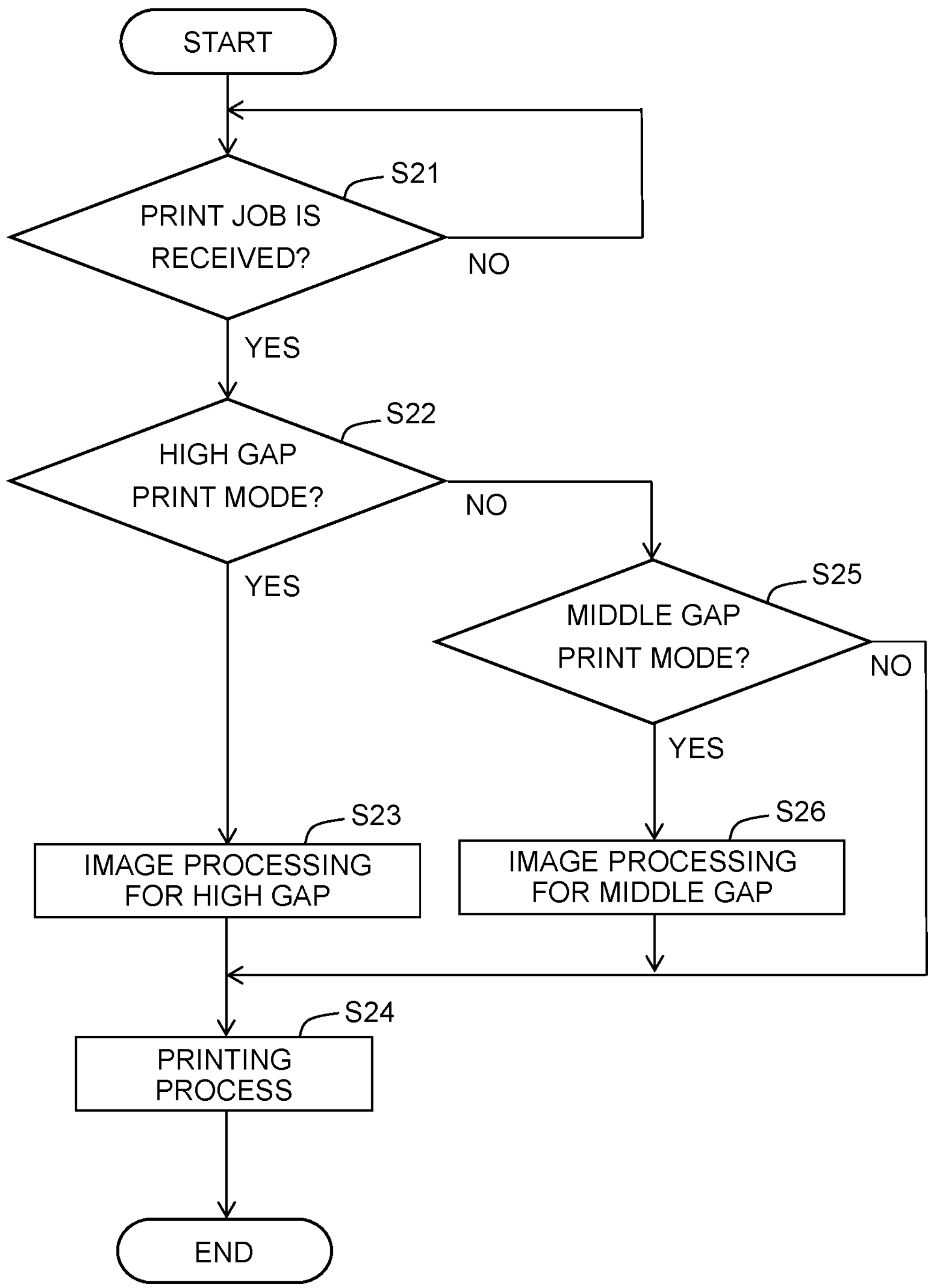
FIG. 14 is a flow chart for explaining the printing process.

As depicted in FIG. 14, first, the mode determining processer 71*a* of the controller 71 determines whether or not any print job is received from the computer 200 which is an external device (step S21). If a print job is received (step S21: Yes), then the mode determining processer 71*a* determines whether or not the print mode is the high gap print mode based on the print job (step S22). On the other hand, if no print job is received (step S21: No), then the mode determining processer 71*a* stands by until a print job is received.

Next, if the print mode is the high gap print mode (step S22: Yes), then the controller 71 carries out an image processing for the high gap (step S23). On this occasion, the controller 71 carries out an image processing using N numbers of master data for N overlapped paths to generate a discharge data. Then, the controller 71 controls the discharge head 20 to carry out the printing process based on the discharge data according to the above image processing (step S24).

On the other hand, if the print mode is not the high gap print mode (step S22: No), then the mode determining processer 71*a* determines whether or not the print mode is the middle gap print mode based on the print job (step S25). If the print mode is the middle gap print mode (step S25: Yes), then the controller 71 carries out an image processing for the middle gap (step S26). On this occasion, the controller 71 carries out the image processing for the middle gap using M (M<N) numbers of master data for M overlapped paths to generate a discharge data. Then, the controller 71 controls the discharge head 20 to carry out the printing process based on the discharge data according to the above image processing (step S24). On the other hand, if the print mode is not the middle gap print mode (step S25: No), then the controller 71 generates the discharge data for the normal printing process and controls the discharge head 20 to carry out the printing process based on the discharge data (step S24).

As described above, according to the fourth embodiment, if the print mode is the high gap print mode, then it is possible to reduce the total number of discharging ink per path by way of discharging over a plurality of overlapped paths. By virtue of this, it is possible to reduce the discharge flow per path in the high gap print mode, and therefore it is possible to suppress deviation of ink landing. By virtue of this, it is possible to suppress decrease in the printing quality as compared with the conventional method.

Further, in the fourth embodiment, the longer the distance between the nozzles 21 and the recording medium W as in the low gap GL, the middle gap GM and the high gap GH, the more the overlapped paths with the controller 71 controlling the discharge head 20. By virtue of this, it is possible to reduce the discharge flow in proportion to the distance between the nozzles 21 and the recording medium W, according to that distance.

Modified Embodiments

The present teaching is not limited to the above embodiments but can undergo various modifications without departing from the true spirit and scope of the present teaching. Here are some examples as follows.

Figure 15:
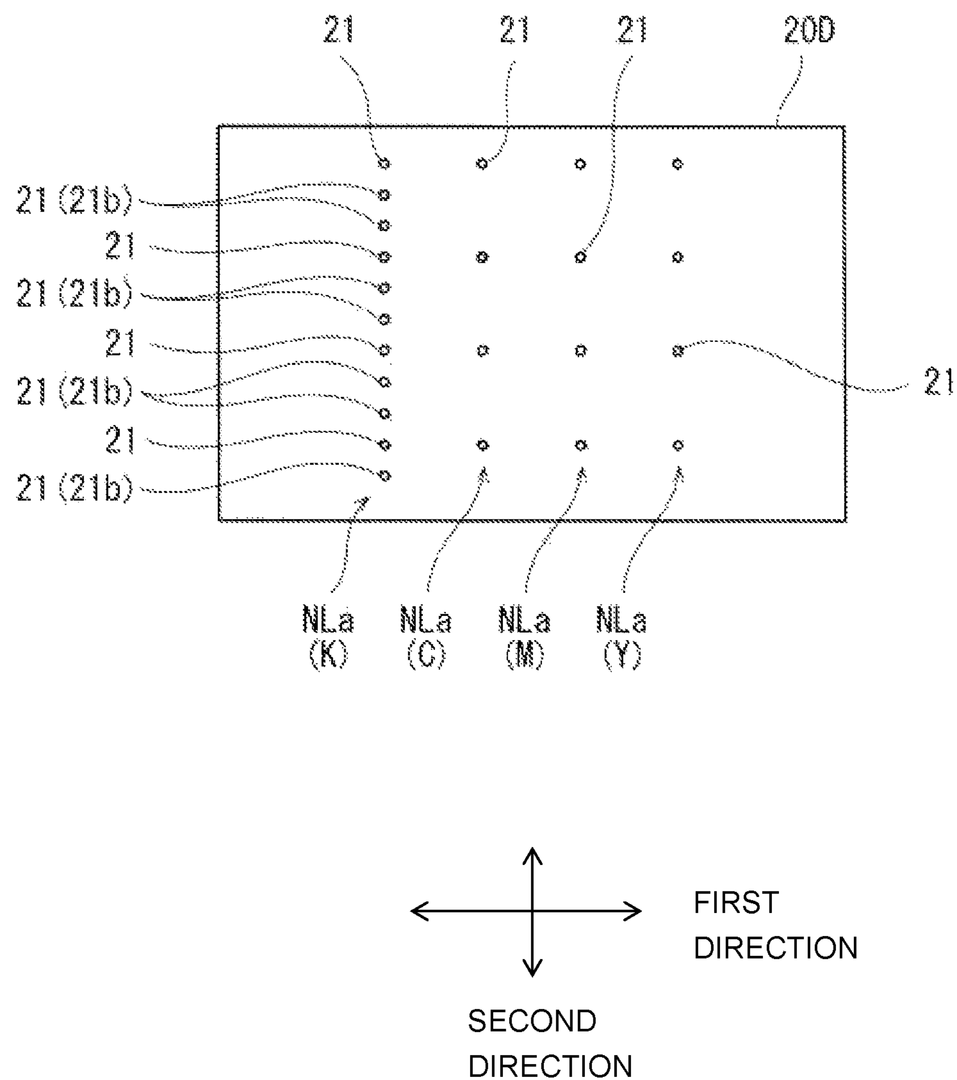
FIG. 15 depicts an example of nozzle arrangement in a discharge head.

The number of nozzles discharging the respective color inks may differ in the following manner. In detail, as depicted in FIG. 15, a discharge head 20D is provided with four nozzle rows NLa. The four nozzle rows NLa are arranged in the first direction almost at equal intervals. Each nozzle row NLa includes a plurality of nozzles 21 arranged to align in the second direction. In the order from one side in the first direction (from the left end in FIG. 15), for example, there are arranged the nozzle row NLa formed from the plurality of nozzles 21 to discharge the black ink, the nozzle row NLa formed from the plurality of nozzles 21 to discharge the cyan ink, the nozzle row NLa formed from the plurality of nozzles 21 to discharge the magenta ink, and the nozzle row NLa formed from the plurality of nozzles 21 to discharge the yellow ink. The number of the nozzles 21 to discharge the black ink is more than the number of the nozzles 21 to discharge the yellow ink, the number of the nozzles 21 to discharge the cyan ink, and the number of the nozzles 21 to discharge the magenta ink.

In the above configuration, if the print mode is determined as the high gap print mode, the controller 71 causes the total number of discharging ink per unit time from the nozzles 21 to discharge the yellow ink, the total number of discharging ink per unit time from the nozzles 21 to discharge the cyan ink, and the total number of discharging ink per unit time from the nozzles 21 to discharge the magenta ink to be equivalent to the case of the low gap print mode. On the other hand, the controller 71 controls the discharge head 20 to reduce the total number of discharging ink per unit time from the nozzles 21 to discharge the black ink as compared with the case of the low gap print mode. On this occasion, the controller 71 controls the discharge head 20 to prevent discharge from the target nozzles 21*b* being one or more than one nozzle of the plurality of nozzles 21 to discharge the black ink as depicted in FIG. 15. By virtue of this, it is possible to reduce the total number of discharging ink per unit time from the nozzles 21 discharging the black ink most frequently in use as compared with the case of the low gap print mode. By virtue of this, it is possible to suppress deviation of the black ink landing in the high gap print mode such that it is possible to suppress decrease in the printing quality.

Further, in the above embodiments, explanation was made for the fact that the print job includes the information indicating the low gap print mode to print in the low gap GL, the high gap print mode to print in the high gap GH, and the middle gap print mode to print in the middle gap GM. However, a sensor may be provided to measure the distance between the discharge surface 40*a* and the recording medium W. Based on the measured result of the sensor, the information may be written into the print job, indicating the low gap print mode to print in the low gap GL, the high gap print mode to print in the high gap GH, and the middle gap print mode to print in the middle gap GM. Further, the sensor may measure the distance between the discharge surface 40*a* and the recording medium W for the ink discharge apparatus 10 to store the measured result as another data than the print job.

What is claimed is:

1. An ink discharge apparatus comprising:

a discharge head having a plurality of nozzle rows arranged in a first direction, each of the nozzle rows including a plurality of nozzles aligned in a second direction intersecting with the first direction; and a controller, wherein the controller is configured to execute:

a mode determining process to receive a print job and to determine whether a print mode is a low gap print mode or a high gap print mode based on the print job, the low gap print mode being a print mode where a distance between the nozzles and a discharge target medium is low gap, the high gap print mode being a print mode where the distance between the nozzles and the discharge target medium is high gap larger than the low gap; and a number of discharge reducing process to reduce a total number of discharging ink per unit time from the nozzles as compared with the case of the low gap print mode, if the print mode is determined as the high gap print mode, if the print mode is determined as the low gap print mode, the controller is configured to set a discharge frequency for each of the mozzles at a first discharge frequency, such that each of the nozzles discharges a first number of ink droplet per the unit time, if the print mode is determined as the high gap print mode, the controller is configured to change the discharge frequency for at least one of the nozzles to a second discharge frequency, such that the at least one of the nozzles discharges a second number of ink droplets per the unit time, and the second number is larger than zero and smaller than the first number.

2. The ink discharge apparatus according to claim 1, wherein the nozzles include a target nozzle to be a reduction target in the number of discharge reducing process, and the controller is configured to execute the number of discharge reducing process such that the ink is not discharged from the target nozzle.

3. The ink discharge apparatus according to claim 1, wherein L1 is defined as an interval between adjacent nozzles in the second direction in each of the nozzle rows and L2 is defined as an interval between adjacent nozzle rows in the first direction, the nozzles include a target nozzle to be a reduction target in the number of discharge reducing process, and if L1 is smaller than L2, the controller is configured to execute the number of discharge reducing process such that the ink is not discharged from the target nozzle.

4. The ink discharge apparatus according to claim 1, wherein the discharge head is provided with a plurality of nozzle row groups in the first direction, in each of the nozzle row groups, L1 is defined as an interval between adjacent nozzles in the second direction in each of the nozzle rows and L3 is defined as an interval between adjacent nozzle rows in the first direction, the nozzles include a target nozzle to be a target in the number of discharge reducing process, the target nozzle being provided in a predetermined nozzle row in each of the nozzle row groups, and if L1 is larger than L3, the controller is configured to execute the number of discharge reducing process such that the ink is not discharged from the target nozzle.

5. The ink discharge apparatus according to claim 1, wherein the discharge head is provided with a plurality of nozzle row groups in the first direction, in each of the nozzle row groups, L1 is defined as an interval between adjacent nozzles in the second direction in each of the nozzle rows and L3 is defined as an interval between adjacent nozzle rows in the first direction, each of the nozzle row groups includes three of the nozzle rows extending respectively in the second direction and arranged in the first direction, the nozzles include target nozzles to be targets in the number of discharge reducing process, the target nozzles being provided in two nozzle rows among the three nozzle rows in each of the nozzle row groups, and if L1 is larger than two times the value of L3, the controller is configured to execute the number of discharge reducing process such that the ink is not discharged from the target nozzle.

6. The ink discharge apparatus according to claim 1, wherein in the discharge head, the nozzle rows form a plurality of nozzle row groups arranged in the first direction, in each of the nozzle row groups, L1 is defined as an interval between adjacent nozzles in the second direction in each of the nozzle rows and L3 is defined as an interval between adjacent nozzle rows in the first direction, each of the nozzle row groups includes three of the nozzle rows extending respectively in the second direction and arranged in the first direction, the nozzles include a target nozzle to be a target in the number of discharge reducing process, the target nozzle being provided in one nozzle row among the three nozzle rows in each of the nozzle row groups, and if L1 is smaller than two times the value of L3, the controller is configured to execute the number of discharge reducing process such that the ink is not discharged from the target nozzle.

7. An ink discharge apparatus comprising:

a discharge head having a plurality of nozzle rows arranged in a first direction, each of the nozzle rows including a plurality of nozzles aligned in a second direction intersecting with the first direction; and a controller, wherein the controller is configured to execute:

a mode determining process to receive a print job and to determine whether a print mode is a low gap print mode or a high gap print mode based on the print job, the low gap print mode being a print mode where a distance between the nozzles and a discharge target medium is low gap, the high gap print mode being a print mode where the distance between the nozzles and the discharge target medium is high gap larger than the low gap; and a number of discharge reducing process to reduce a total number of discharging ink per unit time from the nozzles as compared with the case of the low gap print mode, if the print mode is determined as the high gap print mode, wherein the ink includes a black ink, a yellow ink, a cyan ink, and a magenta ink, among the nozzles, the number of nozzles discharging the black ink is more than the number of nozzles discharging the yellow ink, more than the number of nozzles discharging the cyan ink, and more than the number of nozzles discharging the magenta ink, and if the print mode is determined as the high gap print mode, the controller is configured to cause the total number of discharging ink per the unit time from the nozzles which discharge the yellow ink, the total number of discharging ink per the unit time from the nozzles which discharge the cyan ink and the total number of discharging ink per the unit time from the nozzles which discharge the magenta ink to be equivalent to the case of the low gap print mode, and to reduce the total number of discharging ink per unit the time from the nozzles which should discharge the black ink than the case of the low gap print mode.

8. An ink discharge apparatus comprising:

a discharge head having a plurality of nozzle rows arranged in a first direction, each of the nozzle rows including a plurality of nozzles aligned in a second direction intersecting with the first direction; and a controller;

wherein the controlleer is configured to execute;

a mode determining process to receive a print job and to determine whether a print mode is a low gap print mode or a high gap print mode based on the print job, the low gap print mode being a print mode where a distance between the nozzles and a discharge target medium is low gap, the high gap print mode being a print mode where ithe distance between the nozzles and the discharge target medium is high gap larger than the low gap; and a number of discharge reducing process to reduce a total number of discharging ink per unit time from the nozzles as compared with the case of the low gap print mode, if the print mode is determinied as the high gap print mode, wherein the ink includes a white ink and a clear ink, the controller is configured to determine whether to discharge the white ink and to discharge the clear ink based on the print job, and in a case of determining that the clear ink is to be discharged from the nozzles and in a case of determining that the white ink is to be discharged from the nozzles for forming the base color, the controller is configured to cause the total number of discharging ink per the unit time from the nozzles of the nozzle rows to be equivalent to the case of the low gap print mode.

9. An ink discharge apparatus comprising:

a discharge head having a plurality of nozzle rows arragned in a first direction, each of the nozzle rows including a plurality of nozzles aligned in a second direction intersecting with the first direction; and a controller, wherein the controller is configured to execute;

a mode determining process to receive a print job and to determione whether a print mode is a low gap print mode or a high gap print mode based on the print job, the low gap print mode being a print mode where a distance between the nozzles and a discharge target medium is a low gap, the high gap print mode being a print mode where the distance between the nozzles and the discharge target medium is a high gap larger than the distance of the low gap; and a number of discharge reducing process to reduce a total number of discharging ink per unit time from the nozzles as compared whit the case of the low gap print mode, if the priont mode is determioned as the high gap print mode, wherein the discharge head is configured to move a number of times along the first direction, if the print mode is determined as the high gap print mode, the controller is configured to reduce the total number of discharging ink droplets from the nozzles of the nozzle rows per one movement of the discharge head alont the first direction, the print job inludes information idicating the low gap print mode, the high gap print mode, and a middle gap print mode where the distance between the nozzles and the discharge target medium is longer than the distance of the low gap and shorter than the distance of the high gap, and the controller is configured to control the discharge head to execute printing such that as the distance between the nozles and the discharge target medium increases, a number of movement of the discharge head along the first direction increases.

* * * * *